United States Patent
Nakamura

(10) Patent No.: US 12,081,366 B2
(45) Date of Patent: Sep. 3, 2024

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Takashi Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 572 days.

(21) Appl. No.: 17/149,755

(22) Filed: Jan. 15, 2021

(65) Prior Publication Data

US 2022/0086026 A1    Mar. 17, 2022

(30) Foreign Application Priority Data

Sep. 17, 2020   (JP) ................. 2020-156542

(51) Int. Cl.
*H04L 12/24* (2006.01)
*G06F 3/12* (2006.01)
*H04L 12/46* (2006.01)
*H04L 41/0893* (2022.01)

(52) U.S. Cl.
CPC ........ *H04L 12/4679* (2013.01); *G06F 3/1203* (2013.01); *G06F 3/1236* (2013.01); *G06F 3/1288* (2013.01); *H04L 41/0893* (2013.01)

(58) Field of Classification Search
CPC ............. H04L 12/4679; H04L 41/0893; G06F 3/1203; G06F 3/1236; G06F 3/1288
See application file for complete search history.

(56) References Cited

U.S. PATENT DOCUMENTS

| 7,624,186 | B2 * | 11/2009 | Tanida .................. H04N 1/4413 709/227 |
| 7,675,921 | B2 | 3/2010 | Igarashi |
| 7,730,191 | B2 * | 6/2010 | Otsuka ............... H04N 1/00225 710/36 |
| 7,877,427 | B2 * | 1/2011 | Nakagawa ............ G06F 3/1222 358/1.16 |
| 8,055,789 | B2 * | 11/2011 | Richardson ......... H04L 12/4641 709/238 |
| 8,553,245 | B2 * | 10/2013 | Sakagami .......... H04N 1/00344 713/168 |

(Continued)

FOREIGN PATENT DOCUMENTS

| JP | 3746282 | 2/2006 |
| JP | 3794496 | 7/2006 |

(Continued)

OTHER PUBLICATIONS

"Notice of Reasons for Refusal of Japan Counterpart Application No. 2020-156542", issued on Jun. 11, 2024, with English translation thereof, p. 1-p. 9.

*Primary Examiner* — Alpus Hsu
(74) *Attorney, Agent, or Firm* — JCIPRNET

(57) ABSTRACT

An information processing apparatus includes a processor configured to form a first virtual network, connect the first virtual network to a second virtual network formed by another apparatus, in a case where a specific function is executed, and release a connection between the first virtual network and the second virtual network after the specific function is executed.

7 Claims, 4 Drawing Sheets

(56) References Cited

U.S. PATENT DOCUMENTS

| | | | | |
|---|---|---|---|---|
| 8,593,658 | B2* | 11/2013 | Sato | G06F 3/1289 |
| | | | | 358/1.14 |
| 9,065,939 | B2* | 6/2015 | Tanaka | H04L 63/18 |
| 10,659,629 | B2* | 5/2020 | Ito | H04N 1/00315 |
| 10,812,681 | B2* | 10/2020 | Ando | H04N 1/2179 |
| 11,144,261 | B2* | 10/2021 | Ohara | G06F 3/1239 |
| 11,159,683 | B2* | 10/2021 | Ito | H04N 1/00315 |
| 2007/0234419 | A1 | 10/2007 | Shouno | |
| 2011/0063651 | A1* | 3/2011 | Ehara | H04N 1/4433 |
| | | | | 358/1.14 |
| 2015/0280961 | A1* | 10/2015 | Akune | H04L 67/10 |
| | | | | 709/223 |
| 2021/0349842 | A1* | 11/2021 | Sisterhen | G06F 13/28 |

FOREIGN PATENT DOCUMENTS

| | | |
|---|---|---|
| JP | 2007235455 | 9/2007 |
| JP | 2007293813 | 11/2007 |

\* cited by examiner

<MANAGEMENT DATABASE>

- APPARATUS IDENTIFICATION INFORMATION : MFP-A IP-Adr AND THE LIKE
- GROUP ID : GROUP A
- VLAN-ID : VLAN-001

- APPARATUS IDENTIFICATION INFORMATION : MFP-B IP-Adr AND THE LIKE
- GROUP ID : GROUP A
- VLAN-ID : VLAN-001

<DEVICE LIST>

- MFP-B IP-Adr AND THE LIKE
- MFP-C IP-Adr AND THE LIKE

<DEVICE LIST>

- MFP-A IP-Adr AND THE LIKE
- MFP-C IP-Adr AND THE LIKE

⋮

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-156542 filed Sep. 17, 2020.

BACKGROUND

(i) Technical Field

The present invention relates to an information processing apparatus and a non-transitory computer readable medium storing a program.

(ii) Related Art

A technique for connecting a plurality of virtual networks to each other is known.

JP3794496B discloses a method of configuring virtual LANs distributed to a plurality of sites by monitoring a first virtual LAN configuration frame sent from a plurality of sites with a layer 2 switch, assigning a virtual LAN identifier for a network based on the monitored first virtual LAN configuration frame, and generating a second virtual LAN configuration frame based on the assigned virtual LAN identifier for a network, with the layer 2 switch that has monitored the first virtual LAN configuration frame to propagate to a plurality of layer 2 switches in the network.

JP3746282B discloses a method of, in a virtual LAN, predicting an ingress node and an egress node with heavy traffic by measuring the traffic of an edge node and increasing a bandwidth between the ingress node and the egress node through an optical path setting.

SUMMARY

By the way, it is conceivable to connect a plurality of virtual networks to each other in order to use a specific function. In this case, in a case where a plurality of virtual networks are always connected to each other, security between the plurality of virtual networks may be reduced.

Aspects of non-limiting embodiments of the present disclosure relate to an information processing apparatus and a non-transitory computer readable medium storing a program that improves security between a plurality of virtual networks as compared to a case where a plurality of virtual networks are always connected to each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to form a first virtual network, connect the first virtual network to a second virtual network formed by another apparatus in a case where a specific function is executed, and release a connection between the first virtual network and the second virtual network after the specific function is executed.

BRIEF DESCRIPTION OF THE DRAWINGS

Exemplary embodiment(s) of the present invention will be described in detail based on the following figures, wherein:

FIG. 5 is a diagram showing a device list; and

FIG. 6 is a diagram showing a device list.

DETAILED DESCRIPTION

An information processing system according to the present exemplary embodiment will be described with reference to FIG. 1.

In the information processing system according to the present exemplary embodiment, one or a plurality of virtual networks are formed at each of a plurality of sites, and the plurality of virtual networks are connected to each other between the plurality of sites. For example, a virtual network is formed by an information processing apparatus provided at a site. In the present exemplary embodiment, a plurality of virtual networks are connected to each other in a case where a specific condition is satisfied. Examples of the specific condition include, for example, a case where a user logs in to an information processing apparatus, a case where power of the information processing apparatus is turned on, or a case where a specific function is executed by the information processing apparatus.

Figure 1:
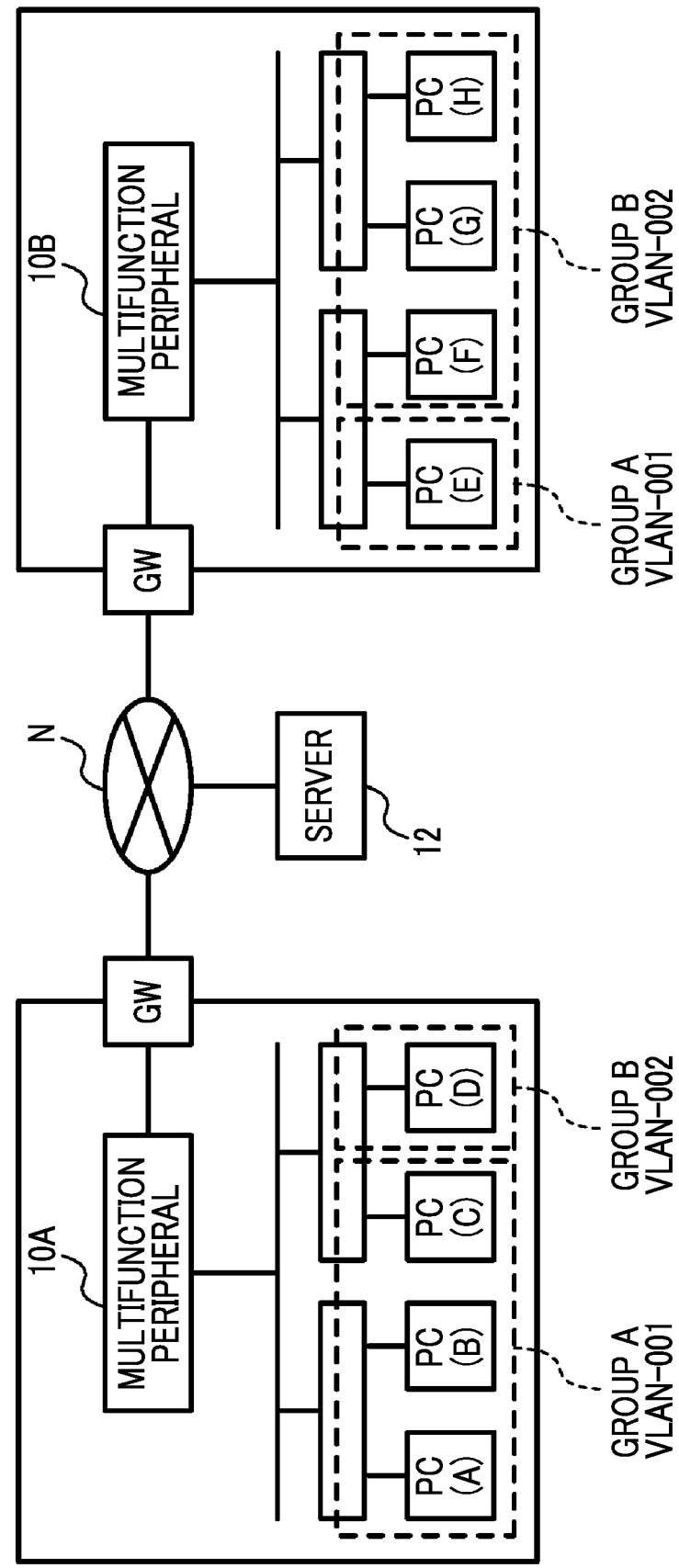
FIG. 1 is a block diagram showing a configuration of an information processing system according to the present exemplary embodiment.

FIG. 1 shows an example of a configuration of an information processing system according to the present exemplary embodiment. The information processing system includes, for example, multifunction peripherals 10A and 10B and a server 12. The multifunction peripherals 10A and 10B and the server 12 can communicate with another apparatus via a communication path N. The communication path N is, for example, the Internet or another network.

The multifunction peripherals 10A and 10B are examples of the information processing apparatus according to the present exemplary embodiment. The multifunction peripherals 10A and 10B include, for example, a printer and a scanner, and function as an image forming apparatus respectively. For example, the multifunction peripherals 10A and 10B have a print function, a scan function, a copy function, and the like. The multifunction peripherals 10A and 10B may have a facsimile function. One or a plurality of virtual networks are formed by each of the multifunction peripherals 10A and 10B.

The multifunction peripherals 10A and 10B are merely examples of the information processing apparatus according to the present exemplary embodiment. The multifunction peripheral may not be included in the information processing system, or, while the multifunction peripheral is included in the information processing system, a device other than the multifunction peripheral, which has a function of forming a virtual network may be included in the information processing system as an example of the information processing apparatus. Such an apparatus may be any apparatus as long as the apparatus has a function of forming a virtual network. For example, an apparatus having an image processing function (for example, an image processing apparatus such as a scanner), a personal computer (hereinafter, referred to as a "PC"), or an apparatus or the like that does not have an image processing function or image forming function may be included in the information processing system as an example of the information processing apparatus.

The multifunction peripherals 10A and 10B can communicate with another apparatus via, for example, a gateway (GW) and a communication path N.

For example, the multifunction peripheral 10A, a PC (A), a PC (B), a PC (C), and a PC (D) are connected to the same network (for example, local area network (LAN)). Further, the PC (A), the PC (B), and the PC (C) belong to a group A, and the PC (D) belongs to a group B. Examples of the group include, for example, a company, a department within a company, or other organization (for example, a circle, a club, and the like).

The multifunction peripheral 10A forms a virtual local area network (VLAN), which is an example of a virtual network, in the LAN in which the multifunction peripheral 10A exists. More specifically, the multifunction peripheral 10A compatible with a VLAN and a switch or a router compatible with a VLAN cooperate to form a VLAN. In the example shown in FIG. 1, VLAN-001, which is a VLAN provided to a group A, and VLAN-002, which is a VLAN provided to a group B, are formed. The PC belonging to the group A can use the VLAN-001 provided by the multifunction peripheral 10A. The PC belonging to the group B can use the VLAN-002 provided by the multifunction peripheral 10B.

For example, the user can select VLAN-001 in the multifunction peripheral 10A and transmit image data generated by scanning by the multifunction peripheral 10A to a PC connected to the VLAN-001. Further, the user can select VLAN-001 in the multifunction peripheral 10A, transmit image data from a PC connected to the VLAN-001 to the multifunction peripheral 10A, and print the image data by using the multifunction peripheral 10A. The same applies when using the multifunction peripheral 10B or when using another virtual network.

Further, a PC (E), a PC (F), a PC (G), and a PC (H) of the multifunction peripheral 10B are connected to the same network (for example, LAN). Further, the PC (E) belongs to the group A, and the PC (F), the PC (G), and the PC (H) belong to the group B.

Similarly to the multifunction peripheral 10A, the multifunction peripheral 10B forms a VLAN, which is an example of a virtual network, in the LAN in which the multifunction peripheral 10B exists. In the example shown in FIG. 1, VLAN-001 provided to group A and VLAN-002 provided to group B are formed. The PC belonging to the group A can use the VLAN-001 provided by the multifunction peripheral 10B. The PC belonging to the group B can use the VLAN-002 provided by the multifunction peripheral 10B.

Figures 2, 3:
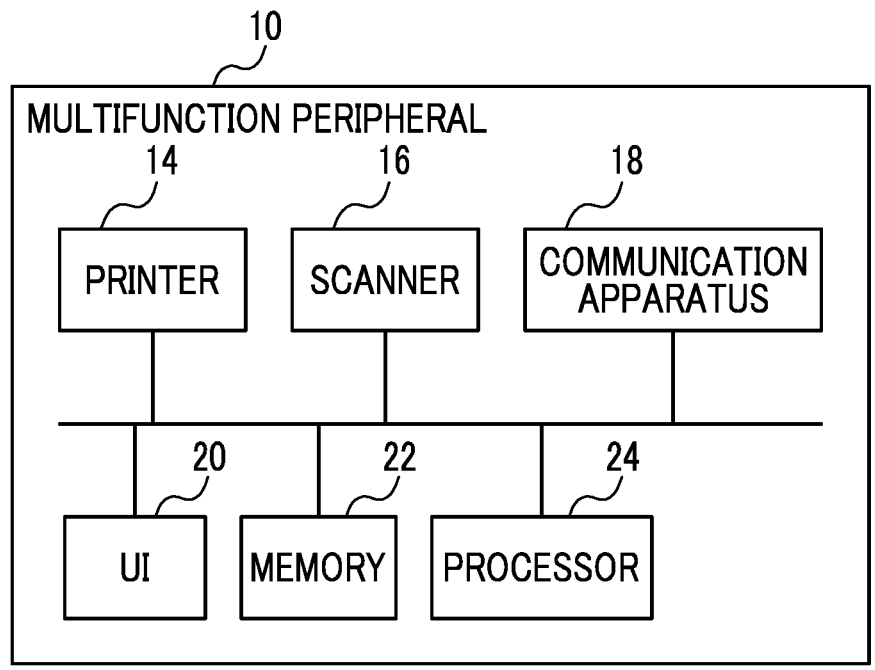
FIG. 2 is a block diagram showing a configuration of a multifunction peripheral.
FIG. 3 is a diagram showing a management database.

Hereinafter, the configurations of the multifunction peripherals 10A and 10B will be described with reference to FIG. 2. Hereinafter, in a case where it is not necessary to distinguish between the multifunction peripherals 10A and 10B, the term "multifunction peripheral 10" is used. FIG. 2 shows an example of a configuration of the multifunction peripheral 10.

The multifunction peripheral 10 includes, for example, a printer 14, a scanner 16, a communication apparatus 18, a UI 20, a memory 22, and a processor 24.

The printer 14 is an apparatus that prints an image on a recording medium such as paper. The scanner 16 is an apparatus that generates image data by reading a recording medium such as paper.

The communication apparatus 18 is a communication interface having a communication chip, a communication circuit, and the like, and has a function of transmitting information to another apparatus and a function of receiving information transmitted from the other apparatus. The communication by the communication apparatus 18 may be wired communication or wireless communication.

The UI 20 is a user interface and includes a display and an operation apparatus. Examples of the display include a liquid crystal display, an EL display, or the like. Examples of the operation apparatus include a keyboard, an input key, an operation panel, or the like. The UI 20 may be a UI such as a touch panel having both a display and an operation apparatus.

The memory 22 is an apparatus that configures one or a plurality of storage areas for storing various types of information. The memory 22 is, for example, a hard disk drive, various types of memory (for example, a RAM, a DRAM, a ROM, and the like), other storage devices (for example, optical disk and the like), or a combination thereof. One or a plurality of memories 22 are included in the multifunction peripheral 10.

The processor 24 is configured to control the operation of each part of the multifunction peripheral 10. The processor 24 may have a memory. For example, the processor 24 forms a virtual network such as a VLAN. Further, the processor 24 connects a virtual network formed by the multifunction peripheral 10 to a virtual network formed by another apparatus. For example, the processor 24 connects a plurality of virtual networks to each other in a case where a specific condition is satisfied.

The server 12 includes a communication apparatus, a UI, a memory, and a processor. A management database for managing a virtual network is formed in the memory of the server 12. In the management database, for example, network identification information (for example, a VLAN-ID) for identifying the formed virtual network, apparatus identification information (for example, an IP address or an MAC address) for identifying the apparatus that formed the virtual network, and group identification information (for example, a group ID) for identifying a group are registered in association with each other, and these information are stored in the memory of the server 12.

FIG. 3 shows an example of a management database. For example, a VLAN provided to a group A is formed by the multifunction peripheral 10A, and the apparatus identification information of the multifunction peripheral 10A (for example, MFP-A IP-Adr (an IP address of the multifunction peripheral 10A)), a group ID indicating a group A, and a VLAN-ID of the VLAN formed by the multifunction peripheral 10A are registered in association with each other.

Similarly, a VLAN provided to a group A is formed by the multifunction peripheral 10B, and the apparatus identification information of the multifunction peripheral 10B (for example, MFP-B IP-Adr (an IP address of the multifunction peripheral 10B)), a group ID indicating a group A, and a VLAN-ID of the VLAN formed by the multifunction peripheral 10B are registered in association with each other.

Hereinafter, descriptions on each Example will be made.

Example 1

Hereinafter, Example 1 will be described. In Example 1, in a case where the user logs in to the multifunction peripheral 10, the virtual network formed by the multifunction peripheral 10 and the virtual network formed by another apparatus are connected. Hereinafter, a flow of processing according to Example 1 will be described in detail.

First, the user logs in to a certain apparatus (here, for example, the multifunction peripheral 10A). For example, authentication for the user is performed by the multifunction peripheral 10A or an apparatus such as an authentication server, and in a case where the authentication is successful, the user is permitted to log in to the multifunction peripheral 10A. Hereinafter, the user who has logged in to the multifunction peripheral 10 will be referred to as a "logged-in user".

In a case where the user logs in to the multifunction peripheral 10A, the VLAN used by the user is confirmed.

For example, a case is possible in which a list of VLAN-IDs of the VLAN formed by the multifunction peripheral 10A is displayed on a display of the multifunction peripheral 10A, and the logged-in user selects a VLAN-ID of the VLAN used by the logged-in user from the list. As another example, the logged-in user may input a VLAN-ID of the VLAN used by the logged-in user to the multifunction peripheral 10A.

As another example, a case is also possible in which a VLAN that can be used by the user is predetermined for each user, and user identification information and the VLAN-ID of the VLAN that can be used by the user are associated with each other in advance to be stored in the multifunction peripheral 10 or the server 12. In this case, the processor 24 of the multifunction peripheral 10A specifies a VLAN having a VLAN-ID associated with the logged-in user as a VLAN used by the logged-in user.

As yet another example, a case is also possible in which the user belongs to a group, a VLAN is associated with the group in advance, and the processor 24 of the multifunction peripheral 10A specifies the VLAN associated with the group to which the logged-in user belongs as a VLAN used by the logged-in user.

In a case where the user logs in to the multifunction peripheral 10A, the processor 24 of the multifunction peripheral 10A transmits virtual network information to the server 12. The virtual network information includes apparatus identification information (for example, an IP address of the multifunction peripheral 10A) of the multifunction peripheral 10A which is the multifunction peripheral to which the user has logged in, group identification information (for example, group ID) of the group to which the logged-in user belongs, and the VLAN-ID of the VLAN used by the logged-in user. Here, as an example, it is assumed that the logged-in user belongs to the group A and the VLAN used by the logged-in user is VLAN-001 belonging to the group A.

The virtual network information is registered in the server 12. As shown in FIG. 3, the apparatus identification information of the multifunction peripheral 10A (MFP-A IP-Adr, and the like), the group ID of the group A to which the logged-in user belongs, and the VLAN-ID (for example, VLAN-001) of the VLAN used by the logged-in user are registered in the server 12.

In a case where the user logs in to the multifunction peripheral 10B, the virtual network information is registered in the server 12 in the same manner as when the user logs in to the multifunction peripheral 10A. Here, as an example, as shown in FIG. 3, the apparatus identification information of the multifunction peripheral 10B (MFP-B IP-Adr, and the like), the group ID of the group A to which the logged-in user belongs, and the VLAN-ID (for example, VLAN-001) of the VLAN used by the logged-in user are registered in the server 12.

When the user logs in to the multifunction peripheral 10, the processor 24 of the multifunction peripheral 10 searches for a VLAN registered in the server 12, and associated with the same group ID. For example, the processor 24 of the multifunction peripheral 10 searches for a VLAN associated with the same group ID as the group ID of the VLAN registered in the server 12 when the user logs in to the multifunction peripheral 10. In a case where the VLAN associated with the same group ID is registered in the server 12, the processor 24 of the multifunction peripheral 10 connects a plurality of VLANs associated with the same group ID to each other. More specifically, the processor 24 of the multifunction peripheral 10 connects a plurality of VLANs associated with the same group ID and having the same network identification information to each other. The processor 24 may inquire the user whether to connect to the VLAN, and in a case where the user instructs to connect, a plurality of VLANs may be connected to each other.

For example, the processor 24 may configure a plurality of VLANs in the same network (for example, a layer 2 bridge connection), or may route IP packets between the VLANs. As a result, IP communication is possible between a plurality of connected VLANs. For example, it becomes possible to access a device (for example, a PC or the like) connected to the VLAN, and execute a discovery protocol, a print protocol, or the like.

For example, the server 12 may hold the virtual network information registered at the time of logging in while the user is logged in to the multifunction peripheral 10, and delete the virtual network information when the user logs out from the multifunction peripheral 10. As another example, the server 12 may delete the virtual network information after a predetermined time has elapsed from the time when the user logs out from the multifunction peripheral 10. For example, the processor 24 of the multifunction peripheral 10 transmits information indicating that the user has logged out from the multifunction peripheral 10 to the server 12, and instructs the server 12 to delete the virtual network information registered at the time of logging in to the multifunction peripheral 10. The server 12 deletes the virtual network information according to the instruction.

Hereinafter, Example 1 will be described with reference to a specific example.

For example, it is assumed that a user belonging to a group A logs in to the multifunction peripheral 10A and then logs in to the multifunction peripheral 10B. As a result, the virtual network information shown in FIG. 3 is registered in the server 12.

As shown in FIG. 3, VLAN-001s belonging to the group A is formed by the multifunction peripherals 10A and 10B and registered in the server 12. That is, VLANs associated with the same group ID and having the same VLAN-ID are formed by the multifunction peripherals 10A and 10B and registered in the server 12. In this case, the processor 24 of the multifunction peripheral 10B connects VLAN-001s belonging to the same group A and having the same VLAN-ID to each other. That is, the processor 24 of the multifunction peripheral 10B connects VLAN-001 that is formed by the multifunction peripheral 10B which is a multifunction peripheral of the processor 24 and belongs to the group A, and VLAN-001 that is formed by the multifunction peripheral 10A which is another apparatus and belongs to the same group A to each other. Here, the VLAN-001 formed by the multifunction peripheral 10B is an example of the first virtual network, and the VLAN-001 formed by the multifunction peripheral 10A is an example of the second virtual network.

The multifunction peripheral 10A is able to access the PC (E) connected to the VLAN-001 formed by the multifunction peripheral 10B. The multifunction peripheral 10B is able to access the PC (A), the PC (B), and the PC (C) connected to the VLAN-001 formed by the multifunction peripheral 10A.

The server 12 deletes the virtual network information registered at the time of login to the multifunction peripheral 10A when the user logs out from the multifunction peripheral 10A, or after a predetermined time has elapsed from the time of the logout. Explaining with an example shown in FIG. 3, the virtual network information including the apparatus identification information of the multifunction peripheral 10A is deleted. Similarly, when the user logs out from the multifunction peripheral 10B, the virtual network information including the apparatus identification information of the multifunction peripheral 10B is deleted.

Example 2

Hereinafter, Example 2 will be described. In Example 2, in a case where a specific function is executed by the multifunction peripheral 10, the virtual network formed by the multifunction peripheral 10 and the virtual network formed by another device are connected to each other. Hereinafter, a flow of processing according to Example 2 will be described in detail.

For example, as shown in FIG. 3, it is assumed that the virtual network information of the VLAN formed by the multifunction peripheral 10A and the virtual network information of the VLAN formed by the multifunction peripheral 10B are registered in the server 12. For example, as in Example 1, when the user logs in to the multifunction peripheral 10, the virtual network information is transmitted from the multifunction peripheral 10 to the server 12 and registered in the server 12.

For example, in a case where the user logs in to the multifunction peripheral 10B and uses a specific function in the multifunction peripheral 10B, the processor 24 of the multifunction peripheral 10B searches for a VLAN registered in the server 12, and associated with the same group ID.

In a case where the VLAN associated with the same group ID is registered in the server 12, the processor 24 of the multifunction peripheral 10B connects a plurality of VLANs associated with the same group ID to each other. More specifically, the processor 24 of the multifunction peripheral 10B connects a plurality of VLANs that are associated with the same group ID and have the same network identification information to each other. The processor 24 may inquire the user whether to connect to the VLAN, and in a case where the user instructs to connect, a plurality of VLANs may be connected to each other. The processor 24 of the multifunction peripheral 10B may connect a plurality of VLANs to each other in a case where the usage conditions for a specific function are met. Further, the processor 24 may permit communication of only packets necessary for executing the specific function between the plurality of VLANs and release the connection of the plurality of VLANs after the execution of the specific function is completed.

The specific function is, for example, a function of printing image data stored in one multifunction peripheral 10 on another multifunction peripheral 10. By using this function, for example, it is conceivable to print the image data stored in the multifunction peripheral 10A on the multifunction peripheral 10B. Hereinafter, a case where this specific function is executed will be described in more detail.

For example, it is assumed that a user belonging to a group A logs in to the multifunction peripheral 10A and stores image data to be printed in the multifunction peripheral 10A. Similar to Example 1 described above, virtual network information including apparatus identification information of the multifunction peripheral 10A (for example, MFP-A IP-Adr), a group ID of a group A, and a VLAN-ID (for example, VLAN-001) of a VLAN used by the user is transmitted from the multifunction peripheral 10A to the server 12 and registered in the server 12.

Next, a user belonging to the group A logs in to the multifunction peripheral 10B. Similar to Example 1 described above, virtual network information including apparatus identification information of the multifunction peripheral 10B (for example, MFP-B IP-Adr), a group ID of a group A, and a VLAN-ID (for example, VLAN-001) of a VLAN used by the user is transmitted from the multifunction peripheral 10B to the server 12 and registered in the server 12.

Next, in a case where the user who has logged in to the multifunction peripheral 10B instructs the multifunction peripheral 10B to execute the above-described specific function, the processor 24 of the multifunction peripheral 10B searches for a VLAN registered in the server 12, and associated with the same group A.

As shown in FIG. 3, VLANs (for example, VLAN-001) belonging to the same group A and having the same VLAN-ID are formed by the multifunction peripherals 10A and 10B and registered in the server 12. In this case, the processor 24 of the multifunction peripheral 10B connects the VLAN-001s to each other. That is, the processor 24 of the multifunction peripheral 10B connects VLAN-001 that is formed by the multifunction peripheral 10B which is a multifunction peripheral of the processor 24 and belongs to the group A, and VLAN-001 that is formed by the multifunction peripheral 10A which is another apparatus and belongs to the same group A to each other. Here, the VLAN-001 formed by the multifunction peripheral 10B is an example of the first virtual network, and the VLAN-001 formed by the multifunction peripheral 10A is an example of the second virtual network.

The processor 24 of the multifunction peripheral 10B may connect, in a case where the image data to be printed is stored in the multifunction peripheral 10A, the VLAN-001 formed by the multifunction peripheral 10B and belonging to the group A, and the VLAN-001 formed by the multifunction peripheral 10A and belonging to the same group A to each other.

The processor 24 of the multifunction peripheral 10B can acquire the image data to be printed stored in the multifunction peripheral 10A from the multifunction peripheral 10A via the VLAN-001 and print the image data. In Example 2, communication of only packets necessary for printing the image data may be permitted between the VLAN-001s. For example, only transmission and reception of the image data to be printed or a print job may be permitted.

The processor 24 of the multifunction peripheral 10B may release the connection of the VLAN-001s from each other in a case where the printing of the image data is completed on the multifunction peripheral 10B.

Further, in a case where the printing of the image data is completed on the multifunction peripheral 10B, the processor 24 of the multifunction peripheral 10B instructs the server 12 to delete the virtual network information registered at the time of logging in to the multifunction peripheral 10B. The server 12 deletes the virtual network information according to the instruction. As a result, the virtual network information including the apparatus identification information of the multifunction peripheral 10B (for example, MFP-B IP-Adr), the group ID of the group A, and the VLAN-ID of the VLAN-001 is deleted from the server 12.

As another example, as in Example 1, in a case where the user logs out from the multifunction peripheral 10B, the processor 24 of the multifunction peripheral 10B may instruct the server 12 to delete the virtual network information registered at the time of logging in to the multifunction peripheral 10B. The server 12 deletes the virtual network information according to the instruction.

Example 3

Figure 4:
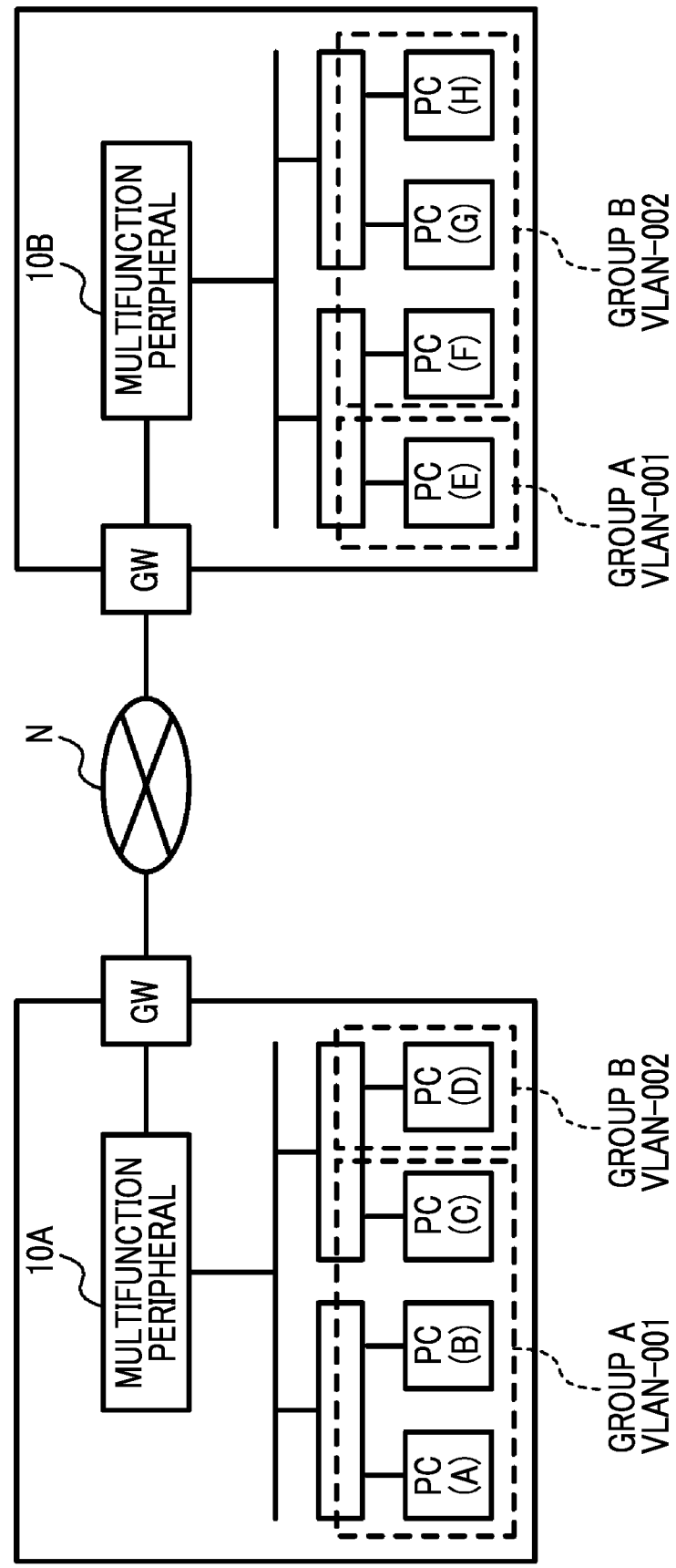
FIG. 4 is a block diagram showing a configuration of an information processing system according to a modification example.

Hereinafter, Example 3 will be described. FIG. 4 shows a configuration of an information processing system according to Example 3. In Example 3, the server 12 is not used and a plurality of virtual networks are connected to each other.

In Example 3, in a case where the user logs in to the multifunction peripheral 10, the virtual network information is stored in the memory 22 of the multifunction peripheral 10. For example, in a case where the user logs in to the multifunction peripheral 10A, the processor 24 of the multifunction peripheral 10A stores the virtual network information in the memory 22 of the multifunction peripheral 10A. The virtual network information includes group identification information (for example, a group ID) of a group to which the logged-in user belongs, and a VLAN-ID of a VLAN formed by the multifunction peripheral 10A and used by the logged-in user. Similarly, in a case where a user logs in to the multifunction peripheral 10B, virtual network information including group identification information of a group to which a logged-in user belongs and a VLAN-ID of a VLAN formed by the multifunction peripheral 10B and used by the logged-in user is stored in the memory 22 of the multifunction peripheral 10B.

Further, in Example 3, a list of devices that are able to serve as partners for constructing a virtual network is stored in advance in the memory 22 of each multifunction peripheral 10. FIG. 5 shows a device list stored in the memory 22 of the multifunction peripheral 10A, and FIG. 6 shows a device list stored in the memory 22 of the multifunction peripheral 10B.

For example, in the device list stored in the memory 22 of the multifunction peripheral 10A, the apparatus identification information (for example, IP address and the like) of the multifunction peripheral 10B and the apparatus identification information (for example, IP address and the like) of the multifunction peripheral 10C are registered.

In the device list stored in the memory 22 of the multifunction peripheral 10B, the apparatus identification information (for example, IP address and the like) of the multifunction peripheral 10A and the apparatus identification information (for example, IP address and the like) of the multifunction peripheral 10C are registered.

For example, it is assumed that a user belonging to a group A logs in to the multifunction peripheral 10A and then logs in to the multifunction peripheral 10B. As a result, the virtual network information is stored in the respective memories 22 of the multifunction peripherals 10A and 10B. For example, the memory 22 of the multifunction peripheral 10A stores virtual network information including the group ID of the group A and the VLAN-ID of the VLAN-001.

Further, virtual network information including the group ID of the group A and the VLAN-ID of the VLAN-001 is stored in the memory 22 of the multifunction peripheral 10B.

The processor 24 of the multifunction peripheral 10B transmits information, to other devices registered in the device list stored in the memory 22 of the multifunction peripheral 10B, inquiring whether or not VLANs belonging to the same group and having the same VLAN-ID are formed by the other devices.

In the example shown in FIG. 6, the processor 24 of the multifunction peripheral 10B transmits inquiry information to the multifunction peripherals 10A and 10B.

Then, the processor 24 of the multifunction peripheral 10B connects the VLANs belonging to the same group and having the same VLAN-ID to each other. For example, a VLAN-001 belonging to the group A is formed by the multifunction peripheral 10B, and a VLAN-001 belonging to the group A is formed by the multifunction peripheral 10A. In this case, the processor 24 of the multifunction peripheral 10B connects the VLAN-001s belonging to the group A to each other. Here, the VLAN-001 formed by the multifunction peripheral 10B is an example of the first virtual network, and the VLAN-001 formed by the multifunction peripheral 10A is an example of the second virtual network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information processing apparatus, provided in a first local area network that is connected to a network, comprising:
   a processor configured to form a first virtual network, in the first local area network, wherein the first virtual network is formed to connect at least one terminal device through a switch or a router provided in the information processing apparatus; and
   a communication interface, controlled by the processer and configured to transmit to an another information processing apparatus and receive information transmitted from the another information processing apparatus that is provided in a second local area network and is connected to the network, wherein the communication interface is further configured to establish a connection through the communication interface to connect the first virtual network to a second virtual network formed by the another information processing apparatus in a case where a specific function is executed by the another information processing apparatus, wherein the second virtual network is in the second local area network, and the second virtual network is formed to connect at least one terminal device through a switch or a router provided in the another information processing apparatus, wherein the specific function is configured to activate at least one peripheral device provided by the another information processing apparatus, and release the connection between the first virtual network and the second virtual network through the communication interface after the specific function is executed.

2. The information processing apparatus according to claim 1, wherein, the processor is configured to connect the first virtual network to the second virtual network, in a case where the specific function is executed and the second virtual network belongs to a same group as the first virtual network.

3. The information processing apparatus according to claim 2, wherein apparatus identification information for identifying the information processing apparatus that forms the first virtual network and the another information processing apparatus that forms the second virtual network, group identification information for identifying at least one group that includes the at least one terminal device in the information processing apparatus and at least one second group that includes the at least one terminal device in the another information processing apparatus, and network identification information for identifying the first and the second virtual network are registered in association with each other, and the processor is configured to connect the first virtual network to the second virtual network, in a case where the specific function is executed and the second virtual network that belongs to the same group as the first virtual network and has a same network identification information as the first virtual network is formed by the another processing apparatus and is registered.

4. The information processing apparatus according to claim 3, wherein the processor is further configured to execute, in a case where the specific function has been executed, processing of deleting registration of the apparatus identification information of the information processing apparatus, the group identification information of a group to which a user who uses the specific function belongs, and the network identification information of the first and the second virtual networks used by the user that are associated with each other.

5. The information processing apparatus according to claim 3, wherein the processor is further configured to register, in a case where a user logs in to the information processing apparatus, the apparatus identification information of the information processing apparatus, the group identification information of the group to which the user belongs, and the network identification information of the first and the second virtual network used by the user in association with each other, and execute, in a case where the user logs out from the information processing apparatus, processing of deleting registration of the apparatus identification information of the information processing apparatus, the group identification information of the group to which the user belongs, and the network identification information of the first and the second virtual network used by the user that are associated with each other.

6. A non-transitory computer readable medium storing a program causing a processor of a computer to execute a process, wherein computer serves as an information processing apparatus provided in a first local area network that is connected to a network, and the information processing apparatus further comprises a communication interface, controlled by the processer and configured to transmit to an another information processing apparatus and receive information transmitted from the another information processing apparatus that is provided in a second local area network and is connected to the network, the process comprising:

forming a first virtual network in the first local area network, wherein the first virtual network is formed to connect at least one terminal device through a switch or a router provided in the information processing apparatus;

establishing a connection through the communication interface of the information processing apparatus to connect the first virtual network to a second virtual network formed by the another information processing apparatus in a case where a specific function is executed, wherein the second virtual network is in the second local area network, and the second virtual network is formed to connect at least one terminal device through a switch or a router provided in the another information processing apparatus, wherein the specific function is configured to activate at least one peripheral device provided by the another information processing apparatus; and releasing the connection between the first virtual network and the second virtual network through the communication interface after the specific function is executed.

7. An information processing apparatus comprising:

means for forming a first virtual network, in the first local area network, wherein the first virtual network is formed to connect at least one terminal device through a switch or a router provided in the information processing apparatus; and means for performing:

transmission to an another information processing apparatus and reception information transmitted from the another information processing apparatus that is provided in a second local area network and is connected to the network, establishment of a connection to connect the first virtual network to a second virtual network formed by the another information processing apparatus in a case where a specific function is executed by the another information processing apparatus wherein the second virtual network is in the second local area network, and the second virtual network is formed to connect at least one terminal device through a switch or a router provided in the another information processing apparatus, wherein the specific function is configured to activate at least one peripheral device provided by the another information processing apparatus, and release of the connection between the first virtual network and the second virtual network after the specific function is executed.

\* \* \* \* \*